US010218156B2

United States Patent
Johnson et al.

(10) Patent No.: US 10,218,156 B2
(45) Date of Patent: Feb. 26, 2019

(54) HIGH STRENGTH DOOR SYSTEMS SUITABLE FOR LOAD CENTERS AND/OR METER BREAKERS

(71) Applicant: Eaton Intelligent Power Limited, Dublin (IE)

(72) Inventors: Jeffrey Lee Johnson, Lincoln, IL (US); James Lee Gehlbach, Lincoln, IL (US)

(73) Assignee: Eaton Intelligent Power Limited, Dublin (IE)

( * ) Notice: Subject to any disclaimer, the term of this patent is extended or adjusted under 35 U.S.C. 154(b) by 53 days.

(21) Appl. No.: 15/408,833

(22) Filed: Jan. 18, 2017

(65) Prior Publication Data
US 2018/0205205 A1 Jul. 19, 2018

(51) Int. Cl.
| H02B 1/06 | (2006.01) |
| E05D 15/58 | (2006.01) |
| H02B 1/48 | (2006.01) |
| H02B 1/052 | (2006.01) |
| E06B 3/50 | (2006.01) |
| H02B 1/38 | (2006.01) |
| H02B 1/44 | (2006.01) |

(52) U.S. Cl.
CPC .......... *H02B 1/066* (2013.01); *E05D 15/581* (2013.01); *H02B 1/052* (2013.01); *H02B 1/38* (2013.01); *H02B 1/44* (2013.01); *H02B 1/48* (2013.01); *E05D 2015/586* (2013.01); *E06B 3/509* (2013.01)

(58) Field of Classification Search
CPC ...... H05K 5/0221; H05K 5/0239; H05K 5/03; H05K 5/0226; H02B 1/26; H02B 1/30; H02B 1/38; H02B 1/44; E06B 7/22
See application file for complete search history.

(56) References Cited

U.S. PATENT DOCUMENTS

| 3,055,996 | A | * | 9/1962 | Beebe | ............... H01H 33/48 200/321 |
| 3,707,653 | A | | 12/1972 | Coffey et al. | |
| 4,642,733 | A | | 2/1987 | Schacht | |
| 5,148,348 | A | | 9/1992 | White | |
| 5,628,534 | A | | 5/1997 | Morgan | |
| 5,834,932 | A | | 11/1998 | May | |
| 6,421,229 | B1 | | 7/2002 | Campbell et al. | |
| 6,478,391 | B1 | * | 11/2002 | Stoever | ............... A47B 47/02 312/265.5 |
| 6,879,483 | B2 | | 4/2005 | Johnson et al. | |
| 7,599,173 | B2 | | 10/2009 | Zhang et al. | |

(Continued)

*Primary Examiner* — Hoa C Nguyen
*Assistant Examiner* — Amol H Patel
(74) *Attorney, Agent, or Firm* — Myers Bigel, P.A.

(57) ABSTRACT

Enclosures for an electrical apparatus include a housing comprising a back and first and second spaced apart sidewalls extending outwardly from the back and providing an interior space and a door pivotably attached to the housing, the door having a primary body with a bottom having a bottom flange and first and second laterally spaced apart side flanges. The bottom flange and the side flanges have a folded inwardly extending edge joining first and second parallel wall segments that are orthogonal to the primary body of the door. The enclosure can also include at least one slot extending through the first and second parallel wall segments of the bottom flange and/or a retention bracket attached to an inner surface of the door that engages the housing.

19 Claims, 19 Drawing Sheets

(56) References Cited

U.S. PATENT DOCUMENTS

| | | |
|---|---|---|
| 8,913,354 B2 | 12/2014 | Van Fossen et al. |
| 2008/0053677 A1 | 3/2008 | Johnson |
| 2011/0204678 A1* | 8/2011 | Katz .................... B62D 33/046 |
| | | 296/186.1 |
| 2018/0139859 A1* | 5/2018 | Reese ...................... H02B 1/38 |

* cited by examiner

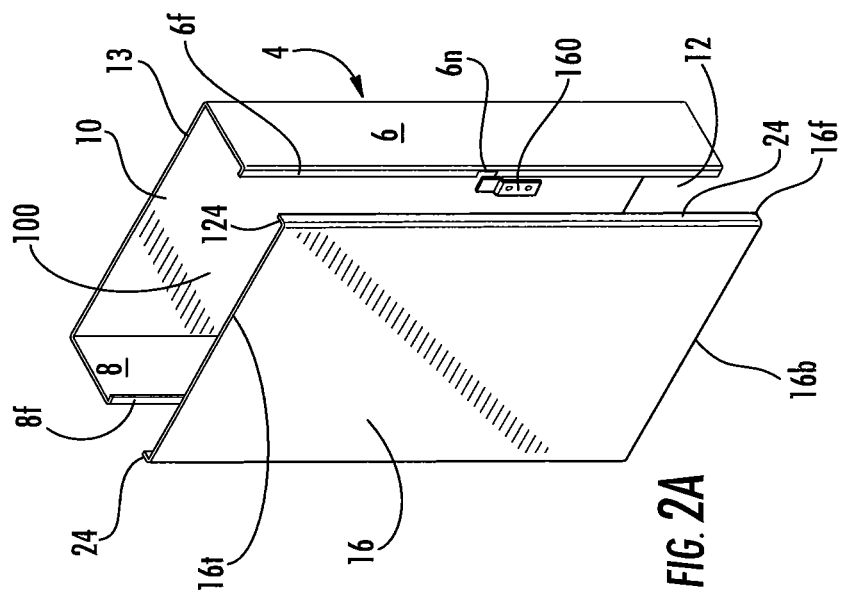
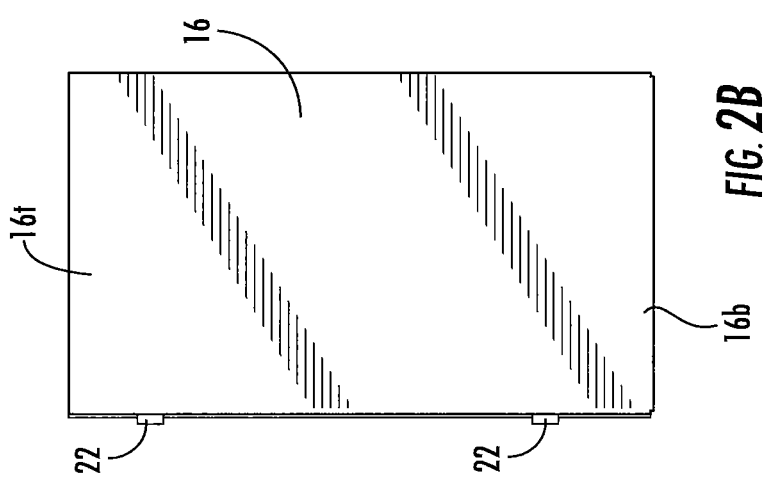

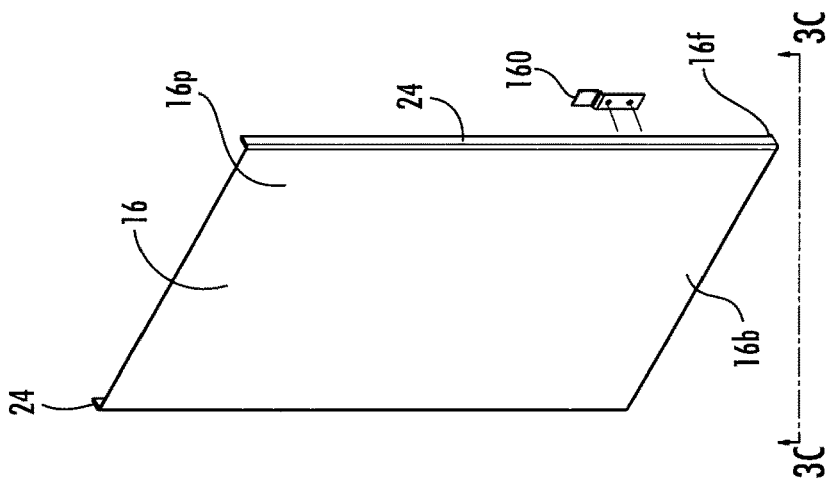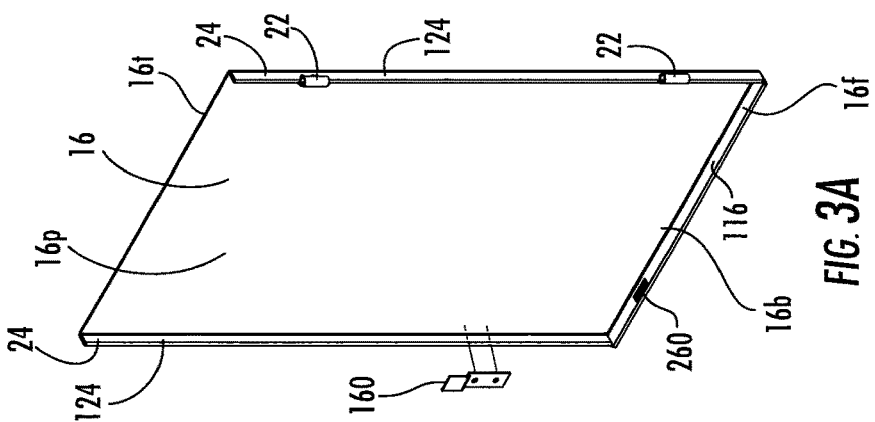

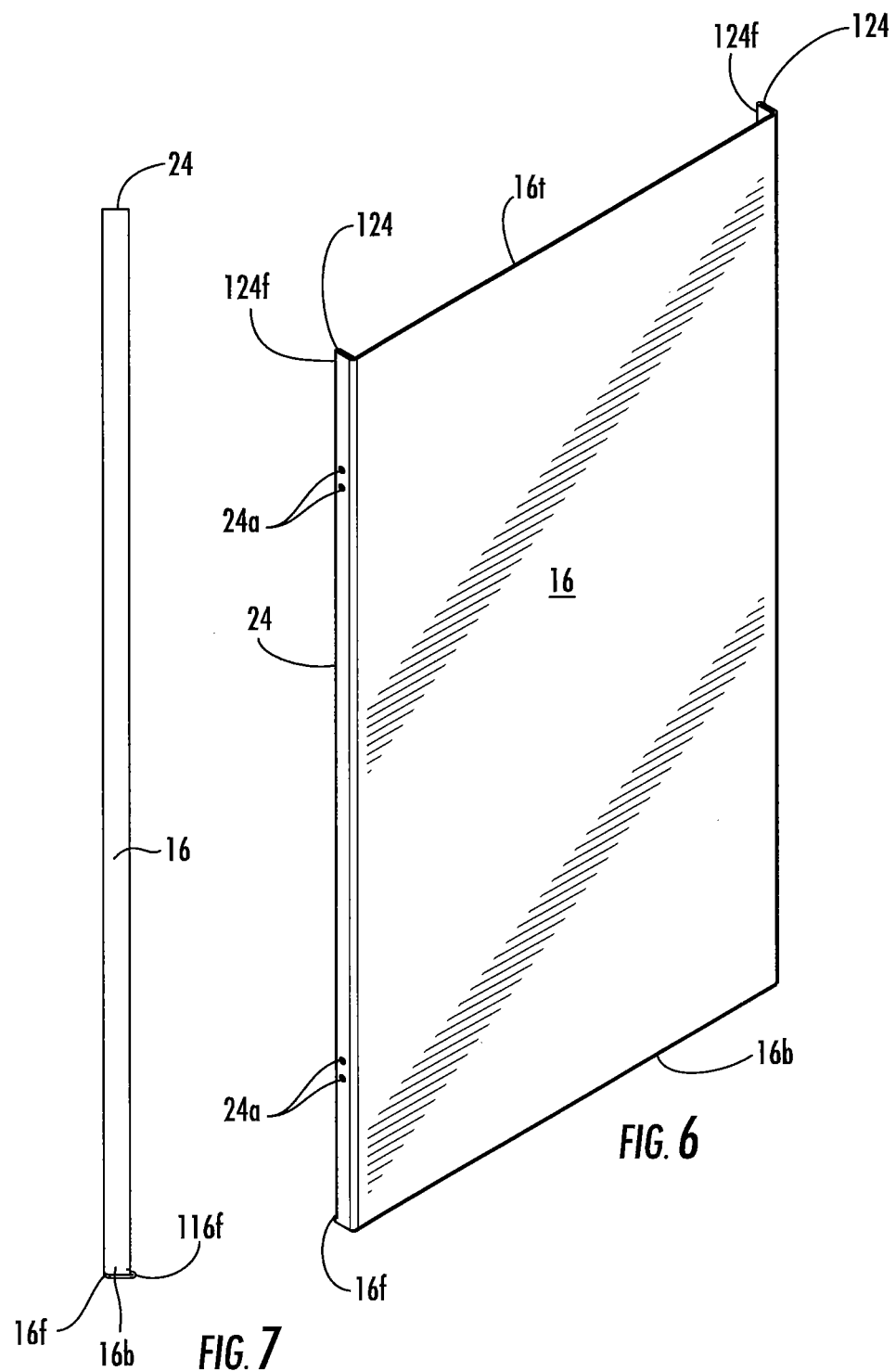

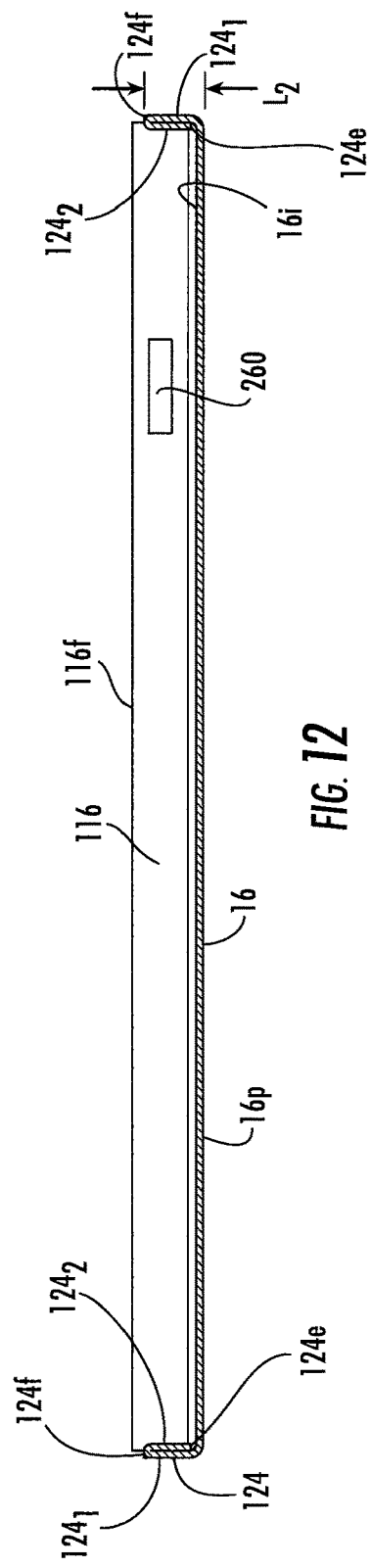

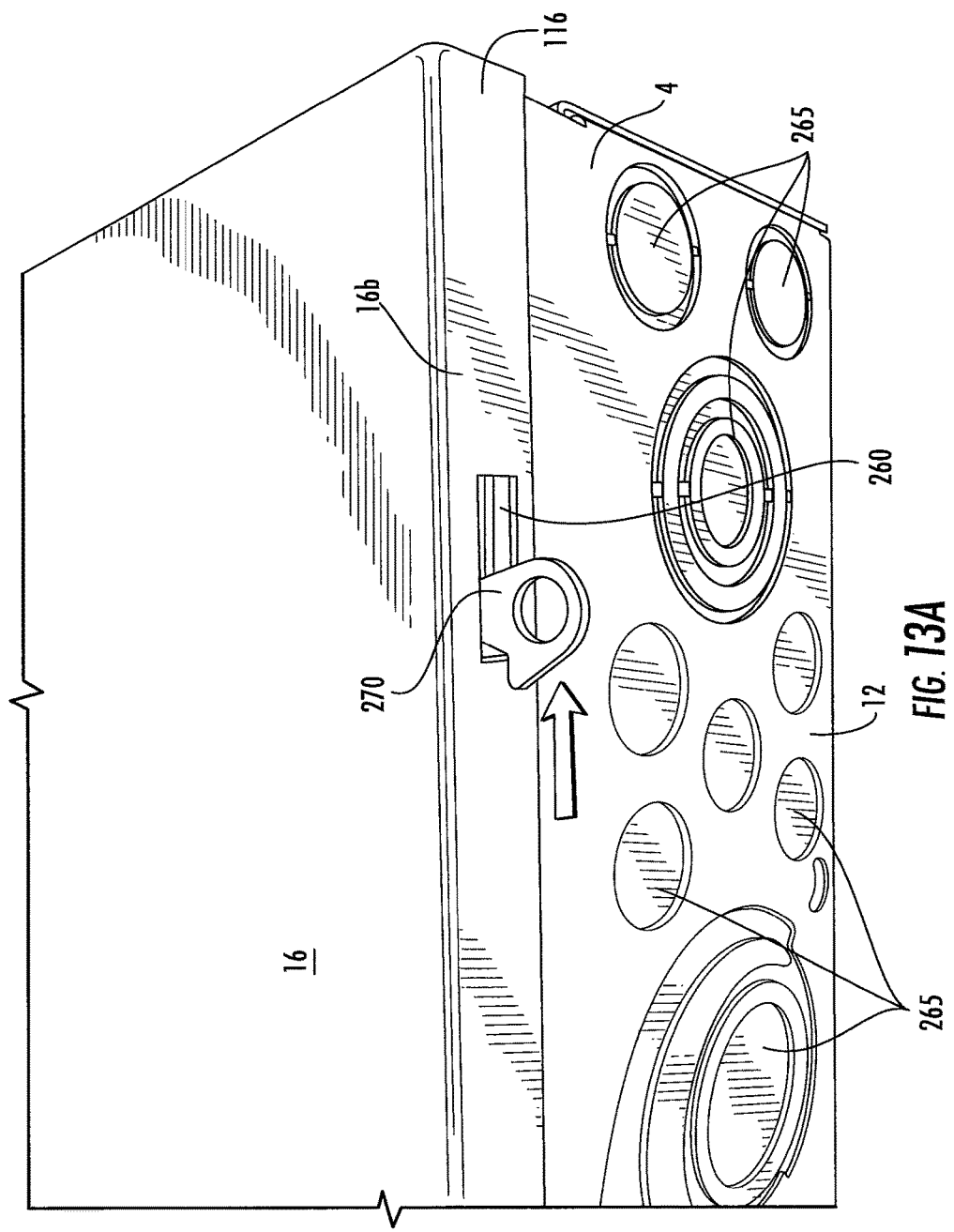

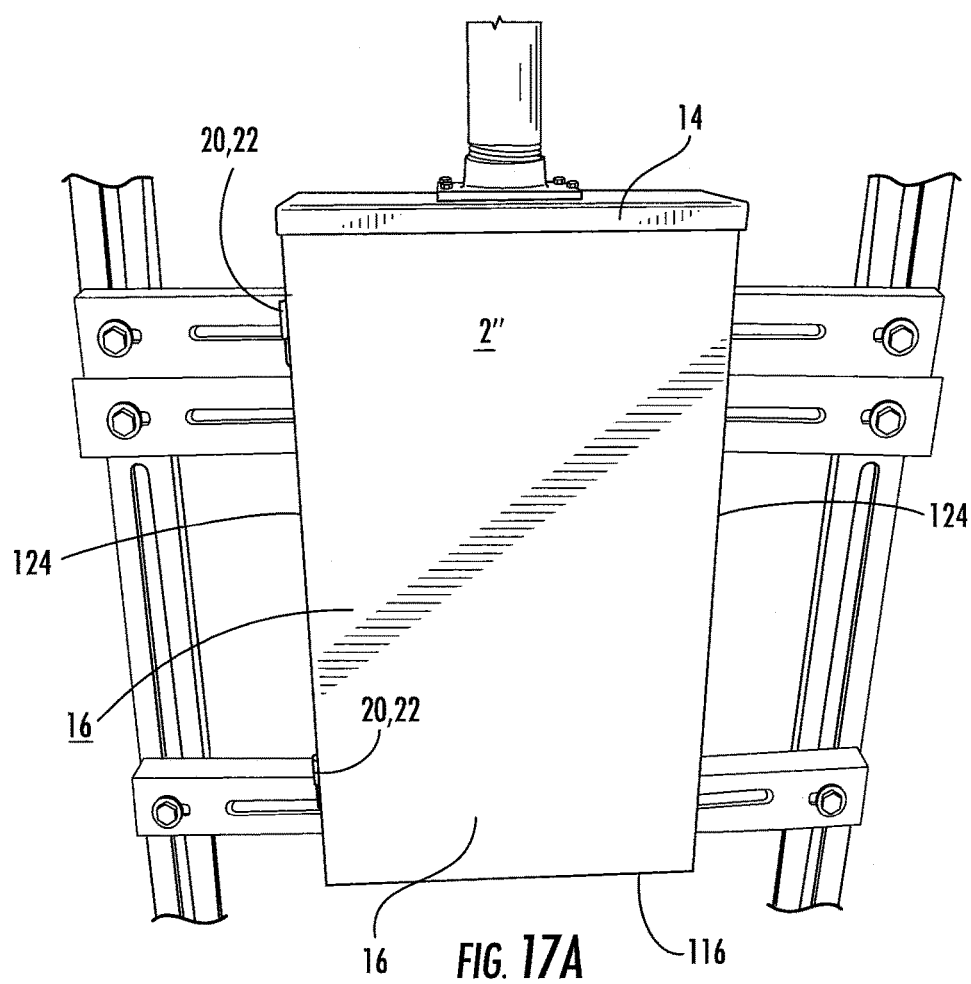

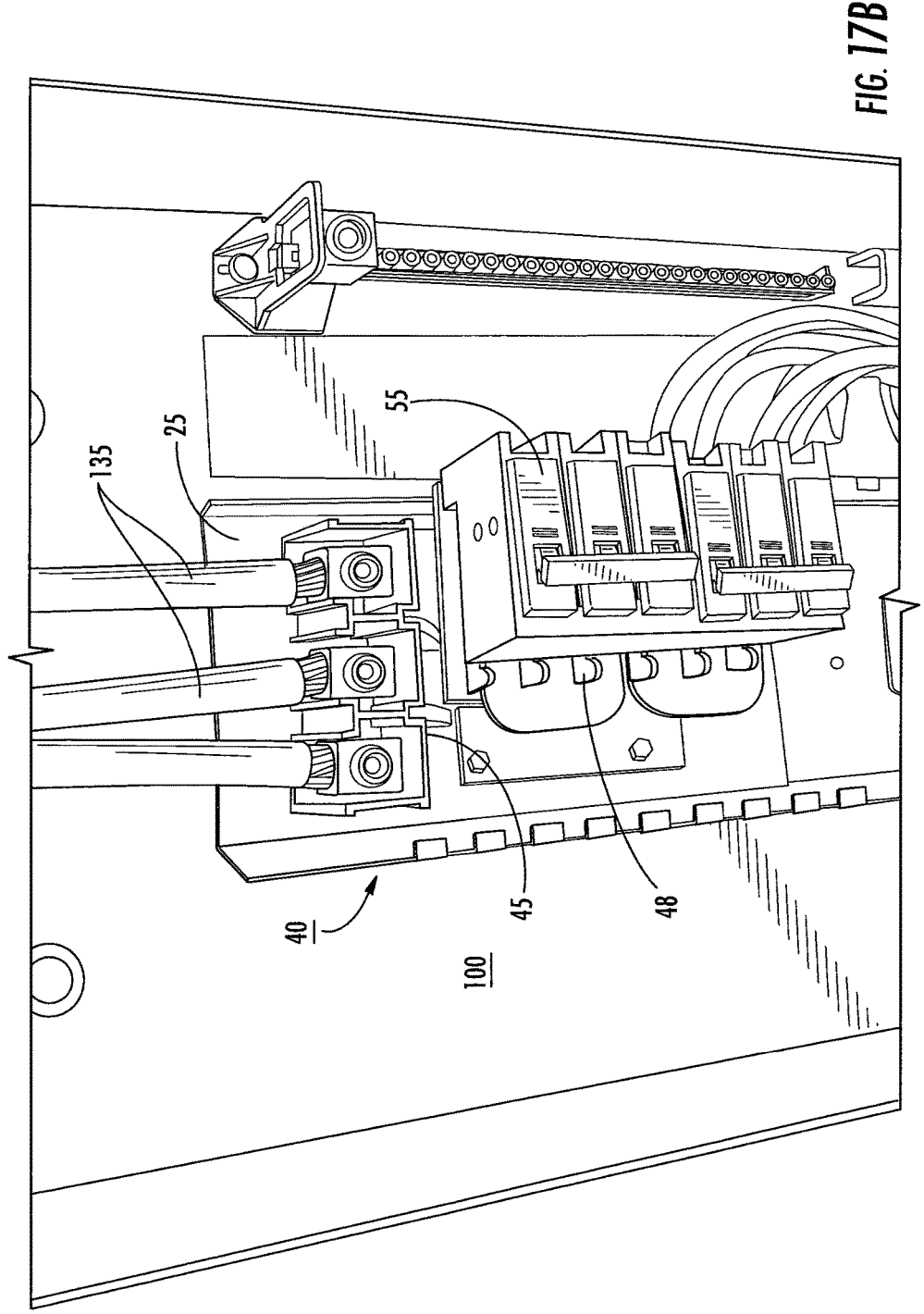

HIGH STRENGTH DOOR SYSTEMS SUITABLE FOR LOAD CENTERS AND/OR METER BREAKERS

FIELD OF THE INVENTION

The present disclosure relates to door systems that may be particularly suitable for electrical devices such as distribution load centers and/or meter breakers.

BACKGROUND OF THE INVENTION

Electrical equipment such as, for example, relays, circuit breakers, electric meters and transformers, are typically housed within an enclosure such as, for example, a housing, such as a box or cabinet, to protect the electrical equipment. Electrical equipment can be held in load centers that include electrical busses with conductors permitting electrical current to be carried throughout the electrical load center. Electrical busses may contain features permitting attachment of fuses, relays, switches, wires, breakers, and other electrical elements.

When such electrical equipment is disposed outdoors, it should be protected from the environment, for example, to prevent electrical faults caused by moisture. Accordingly, outdoor electrical enclosures are provided with a variety of moisture-resistant devices such as hoods and/or overlapping covers and doors.

FIG. 1 shows an example of one such enclosure. Specifically, an outdoor electrical enclosure 2 is shown which generally comprises a housing 4 having opposing sides 6, 8, a back panel 10 extending between the sides 6, 8, a bottom 12, a hood 14, and a door 16. The door 16 is coupled to side 6 of the housing 4 by way of telescopic hinge assemblies 18. The telescopic hinge assemblies 18 are structured to permit the door 16 to be adjusted in the vertical direction for providing a proper moisture-resistant fit with respect to the hood 14, such that the hood 14 partially covers or overlays the top of the door 16 when the door 16 is closed. Telescopic hinges are discussed, for example, in U.S. Pat. No. 6,879,483 issued on Apr. 12, 2005 to Johnson et al., entitled "Outdoor Electrical Enclosure and Hood Therefor" and U.S. Patent Application Publication No. 2008/0053677, the contents of which are incorporated by reference as if recited in full herein.

Generally stated, each telescopic hinge assembly 18 includes a hinge pin 20, which is coupled to the side 6 of the enclosure housing 4, and a corresponding hinge bracket 22. The hinge brackets 22 are separate components which are suitably fastened to the side flange 24 of the door 16. Each hinge bracket 22 includes a tubular portion 26 that pivotably receives a corresponding one of the hinge pins 20, and a flange segment 28 which is welded to the door side flange 24. Similar multi-component hinge assemblies (not shown) are employed for pivotable doors which are not required to be telescopic in nature, with the primary difference of such doors being only that the pins (not shown) are not structured to provide vertical movement of the door 16.

SUMMARY OF EMBODIMENTS OF THE INVENTION

Embodiments of the present application provide door systems that have improved strength over conventional door systems and may inhibit buckling, improve door retention and resist deformation at latch and slot locations when exposed to various events such as those encountered during a short circuit.

Embodiments of the present invention provide door systems and/or electrical enclosures, such as, for example panel boards, with high strength configurations.

Enclosures for an electrical apparatus include a housing with a back and first and second spaced apart sidewalls extending outwardly from the back that provide an interior space. The enclosures also have a door pivotably attached to the housing. The door includes a primary body with a bottom having a bottom flange and first and second laterally spaced apart side flanges. The bottom flange and the side flanges have a folded inwardly extending edge joining first and second parallel wall segments that are orthogonal to the primary body of the door.

The enclosure may include at least one slot extending through the first and second parallel wall segments of the bottom flange.

The enclosure can include a retention bracket attached to an inner surface of the door that engages the housing.

The enclosure may include a hood attached to the housing and the door. The hood can extend over a top portion of the door. The door and housing can be attached with a telescoping hinge assembly to allow the door to travel vertically between upper and lower positions while held by the hinge assembly.

The enclosure can include a bracket attached to at least one of the first and second sidewalls of the housing that engages the retention bracket of the door.

The enclosure can include a hood attached to the housing and the door. The hood can extend over a top portion of the door. The door and housing can be attached with a telescoping hinge assembly to allow the door to travel vertically between upper and lower positions while held by the hinge assembly. At least one of the first and second sidewalls of the housing can include a flange that extends inward, in a direction orthogonal to the sidewalls. The flange can include a longitudinally extending notch with an open inner perimeter that engages the retention bracket when the door is in the upper position.

The bottom flange can have a length that is greater than the side flanges.

The first and second parallel wall segments can be inner and outer wall segments and the outer wall segments can be longer than the inner wall segments.

The inner and outer wall segments of the side flanges and the bottom flange can abut each other.

The door can have a flangeless top and the three side flanges can have a length between 0.25 inches and 1.5 inch.

The enclosure can be one of a load center or a meter breaker.

The door and the housing can be attached with at least one telescoping hinge assembly on a first side to allow the door to travel vertically between upper and lower positions while held by the at least one hinge assembly. The door and housing can be attached at a medial segment at a second opposing side by a sliding hinge assembly that disengages when the door is extended down to allow the door to rotate open via the hinge assembly on the first side.

The enclosure can include at least one circuit breaker in the housing.

The enclosure can include first, second and third telescoping hinge members attached to at least one of the first and second sidewalls of the housing and the door providing the pivotable attachment, with a medial one of the first, second and third hinge assemblies having an inverted orientation relative to an upper and lower hinge assembly.

An outer wall segment of the first and second wall segments of the bottom flange can include slots that engage downwardly extending protrusions of the housing.

The door can be a monolithic single sheet of sheet metal with bends forming the side and bottom flanges.

The enclosure can include a latch in the housing extending through the latch slot and configured to slide right or left to allow the door to travel downward while held by hinge assemblies of the pivotable attachment.

Other embodiments are directed to methods of fabricating a door for an electrical apparatus. The methods include: providing a single sheet of sheet metal for a door of an electrical apparatus; bending side portions of the sheet of sheet metal to extend in an orthogonal direction from a primary body portion; folding a partial length of the bent side portions toward the primary body portion to form side flanges with parallel double walls; bending a bottom portion of the sheet metal to extend in an orthogonal direction from the primary body portion; folding a partial length of the bent bottom portion toward the primary body portion to form a bottom flange with parallel double walls; and forming a door for the electrical apparatus with a flangeless top and the sides and bottom flanges with double walls.

The sheet can be provided with parallel slots in the bottom portion which when bent form the double walls of the bottom flange and align to provide a through slot.

The folding steps can be carried out to provide abutting double walls as the double walls, and wherein the bottom flange extends inwardly a greater distance than the side flanges by between 0.1 inches and 0.25 inches.

Further features, advantages and details of the present invention will be appreciated by those of ordinary skill in the art from a reading of the figures and the detailed description of the preferred embodiments that follow, such description being merely illustrative of the present invention.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

BRIEF DESCRIPTION OF THE DRAWINGS

FIG. 2A is a side perspective view of a housing (without a top or bottom) having an enclosure space and a cooperating door according to embodiments of the present invention.

FIG. 2B is a front view of the door and housing shown in FIG. 2A.

FIG. 3A is a rear perspective view of a door with a cooperating bracket according to embodiments of the present invention.

FIG. 3B is a front perspective view of the door and bracket shown in FIG. 3A.

FIG. 3C is a side rear perspective view of the door and bracket shown in FIG. 3B according to embodiments of the present invention.

FIG. 4 is a side view of the door and bracket shown in FIG. 3A.

FIG. 6 is an enlarged front side perspective view of the door shown in FIG. 5.

FIG. 7 is a side view of the door shown in FIGS. 5 and 6.

FIG. 12 is an enlarged section view (scale 2:1) taken along line 12-12 in FIG. 11.

FIG. 13A is a bottom perspective view of an enclosure assembly with the door latch extending through the slot in the door and slidable in a sideways movement (indicated by arrow) to allow the door to be released to move downward as shown in FIG. 13B.

FIG. 17A is a front view of an exemplary load center according to embodiments of the present invention.

FIG. 17B is a side perspective view of the load center shown in FIG. 17A without the door according to embodiments of the present invention.

DETAILED DESCRIPTION OF EMBODIMENTS OF THE INVENTION

Figure 1:
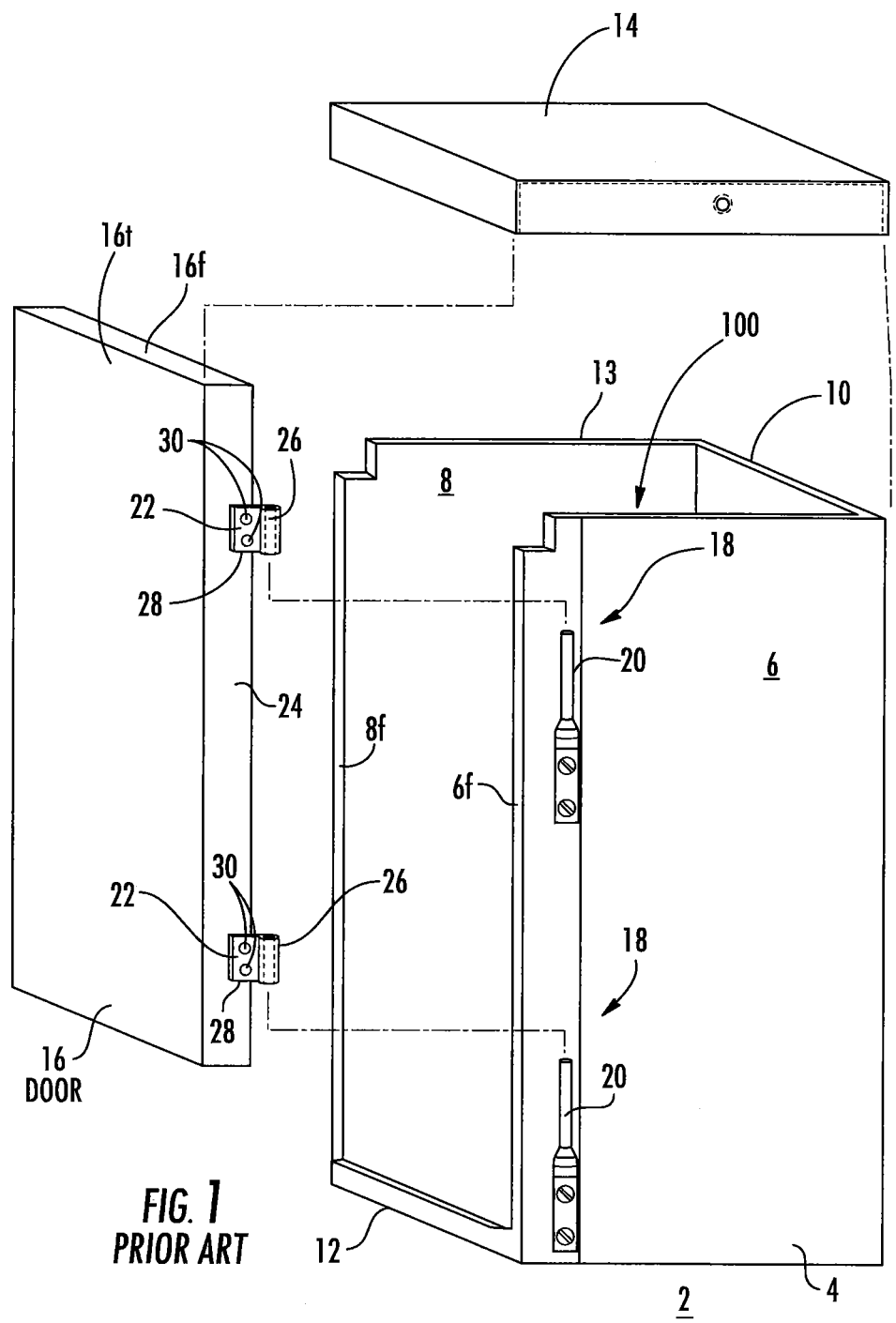
FIG. 1 is a partially exploded side perspective view of a prior art electrical enclosure and door system.

The present invention now will be described more fully hereinafter with reference to the accompanying drawings, in which illustrative embodiments of the invention are shown.

Like numbers refer to like elements and different embodiments of like elements can be designated using a different number of superscript indicator apostrophes (e.g., 10, 10', 10", 10'"). The terms "FIG." and "FIG." may be used interchangeably with the word "Figure" as abbreviations thereof in the specification and drawings. In the figures, certain layers, components or features may be exaggerated for clarity, and broken lines illustrate optional features or operations unless specified otherwise.

In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

The term "about" refers to numbers in a range of +/−20% of the noted value.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

Embodiments of the invention are particularly suitable for electrical devices such as load centers and/or meter breakers. The terms "load center" and "electrical distribution load center" refer to the collective components of an electrical distribution system and its respective housing that supplies electrical power to one or more subsidiary circuits. The terms "bus," "bus element," "electrical distribution bus," or "bus bar" refers to components in an electrical distribution system that conducts electricity within the load center.

For purposes of illustration, embodiments of the invention will be described as applied to outdoor electrical enclosures for enclosing electrical equipment (e.g., without limitation, relays; circuit breakers; electric meters; transformers), although the enclosures and/or door systems may also be applied to doors of other types and/or to enclosures adapted for both indoor and outdoor, weather-resistant use.

Figure 13B:
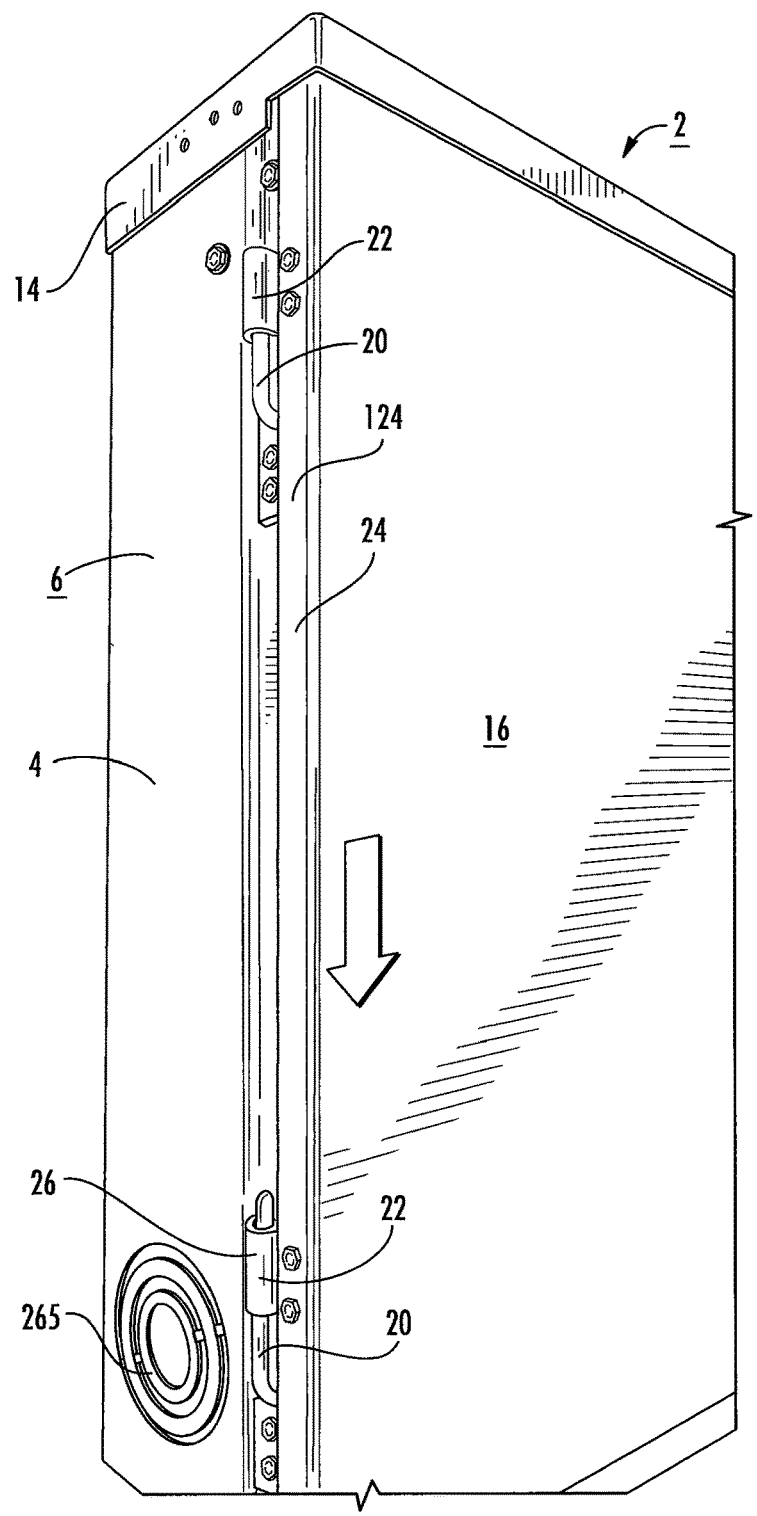
FIG. 13B is a side perspective view of the enclosure assembly shown in FIG. 13A illustrating (via downward arrow) an exemplary slidable door direction according to embodiments of the present invention.

FIG. 1 shows an electrical enclosure 2 with an interior space 100 that is sized and configured to hold electrical components (e.g., without limitation, a panel board; a load center; a switchgear cabinet). The electrical enclosure 2 includes a housing 4 that cooperates with a door 16 and a hood 14 (also known as a "cover") as shown in FIG. 13B. The housing 4 has a back panel 10 and opposing sides 6, 8 extending outwardly from the back panel member 10 to define an interior 100. The housing 4 also includes a bottom 12 and a top 13. The housing sidewalls 6, 8, can each include inwardly extending flange ends 6f, 8f that are orthogonal to the sidewalls 6, 8 and the flanges 6f, 8f can face each other extend over the entire length or substantially the entire length (within about 10% thereof) of the sidewalls 6, 8. The cover or hood 14 can comprise any known or suitable top, cover or hood such as, for example and without limitation, a moisture-resistant, metallic or polymeric hood.

Referring to FIG. 2A, FIG. 2B, and FIGS. 3A-3C, for example, the door 16 includes a top 16t and a bottom 16b. A retention bracket 160 can be attached to an inside surface of the door 16 adjacent one side and facing a notch 6n in the flange 6f. The retention bracket 160 can engage the notch 16n to help secure the door 16 to the enclosure housing 4. When the door telescopes to an upward position to engage the latch 270 (FIG. 13A), the retention bracket 160 can engage the flange notch 6n and can provide additional resistance to impact facilitating the door to be retained during a short circuit or other electrical event. The retention bracket 160 can be on a right or left side or both a right and left side (in the orientation shown) and the engagement notch 6n can be on one or both corresponding flanges 6f, 8f.

Figure 2C:
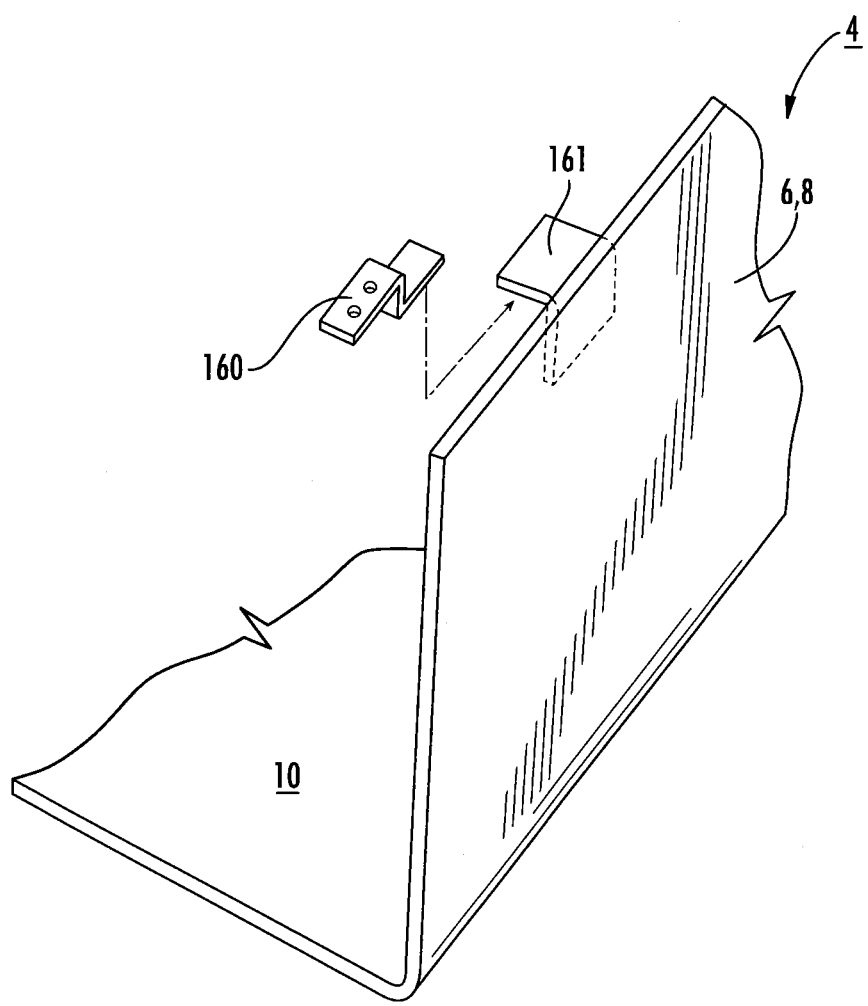
FIG. 2C is a partial side perspective view of a housing with a bracket that engages a retention bracket of the door according to embodiments of the present invention.

As shown in FIG. 2C, instead of a notch 6n, the enclosure housing 4 can include a cooperating bracket 161 that is attached to the sidewall 6 (or 8 or both 6 and 8) to engage the bracket 160 of the door 16 and can provide additional resistance to impact facilitating the door 16 to be retained during a short circuit or other electrical event.

Referring to FIG. 3A-3C, for example, the door 16 can include outer side flanges 24 that are parallel to the sidewalls 6, 8 of the housing 4 and orthogonal to a primary body of the door 16p. Unlike conventional doors, the flanges 24 can comprise a double wall 124. Similarly, the bottom of the door 16b can comprise an inwardly extending flange 16f that has a double wall 116.

The top of the door 16t can be flangeless and have an upper edge that faces the hood or cover 14 and has a single wall configuration as does the primary body of the door 16p. However, in other embodiments, the top of the door 16t can also include an inwardly extending flange as shown in FIG. 1, and the top flange 16f may have a single wall or double wall configuration.

In some embodiments, the door 16 is rectangular and has only three of four sides with short (less than two inches, typically between 0.25 inches and 1.5 inches) inwardly extending flanges 24, 16f, that each comprise respective double walls, 124, 116.

As shown in FIGS. 3A, 3C, 5, 8, 12 and 13A, for example, a latch slot 260 can reside through both walls 116 in the bottom flange 16f. As shown in FIG. 13A, a latch 270 can extend through the latch slot 260 and a user can slide the latch 270 a defined direction, shown by way of example only, as to the right by the arrow in FIG. 13A, in the latch slot 260 to allow the door 16 to travel vertically, typically down from the hood 14, as shown by the arrow in FIG. 13B. As also shown in FIGS. 13A and 13B, in some embodiments, the bottom 12 and at least one side 6, of the enclosure 4, can include pre-formed and removable (i.e., circular cutout) housing segments 265 for pipes, conduits and other access components.

Figure 9:
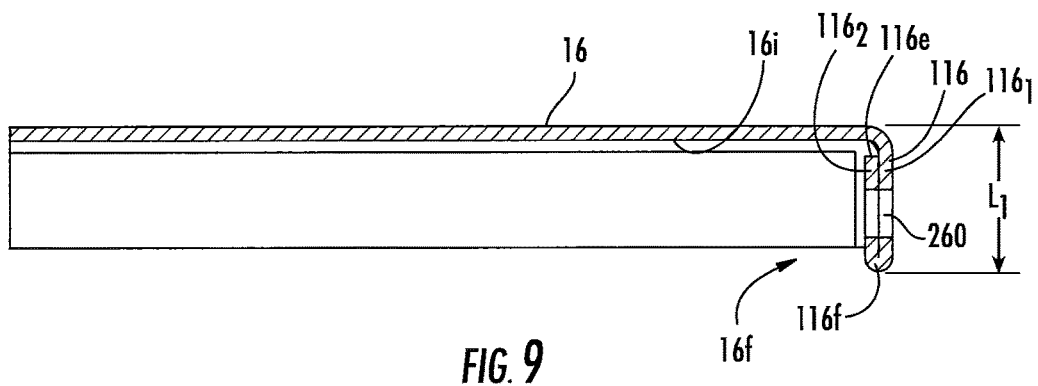
FIG. 9 is an enlarged (scale 2:1) section view taken along line 9-9 of FIG. 8.

Referring to FIG. 9, the double wall 116 of the bottom flange 16b has a folded edge 116f that connects first and second parallel wall segments $116_1$, $116_2$. The second or inner wall segment $116_2$ has a free end 116e that faces the inner surface 16i of the primary body 16p of the door 16. The wall segments $116_1$, $116_2$ can be very closely spaced apart from one another (within about 0.1 inches) or can abut each other. The inner wall segment $116_2$ can extend in a range of 50-100% of a length $L_1$ of the outer wall segment $116_1$, more typically in a range of about 75% to about 95%.

Referring to FIG. 12, the double wall 124 of the door side flanges 24 has a folded edge 124f that connects first and second parallel wall segments $124_1$, $124_2$. The second or inner wall segment $124_2$ has a free end 124e that faces the inner surface 16i of the primary body 16p of the door 16. The wall segments $124_1$, $124_2$ can be very closely spaced apart from one another (within about 0.1 inches) or can abut each other. The inner wall segment $124_2$ can extend in a range of 50-100% of a length $L_2$ of the outer wall segment $124_1$, more typically in a range of about 75% to about 95%.

Figure 5:
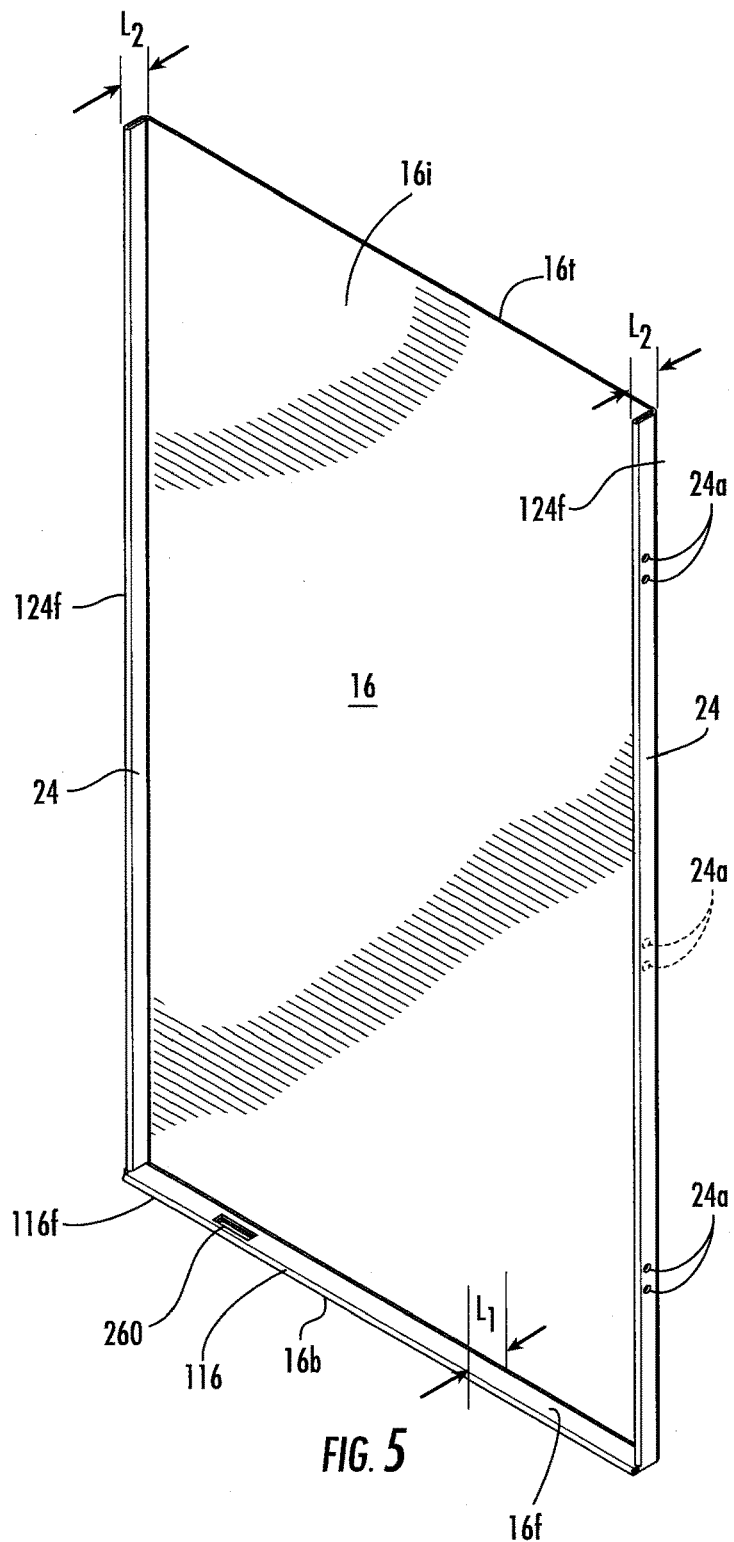
FIG. 5 is an enlarged view of the door shown in FIG. 3A also shown without the hinges according to embodiments of the present invention.
Figure 8:
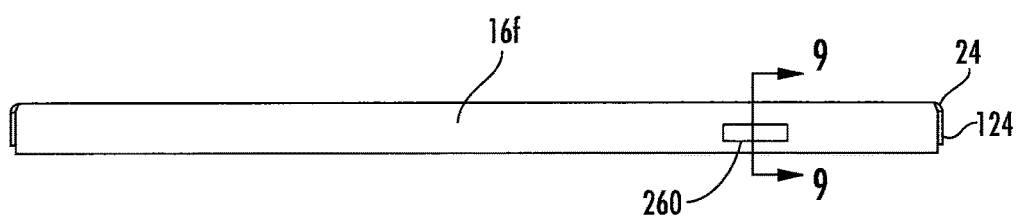
FIG. 8 is a bottom view of the door shown in FIG. 5.

Referring to FIGS. 5 and 9, measured from the front surface of the door 16, the bottom flange 16f can have a length $L_1$ that is between 0.1 inches and 2 inches (and this length can correspond to the length of the outer wall segment $116_1$), but is typically between 0.25 and 0.5 inches. The side flanges 24 can have a length $L_2$ that is between 0.1 inches and 2 inches (and this length can correspond to the length of the outer wall segment $124_1$) but is typically between 0.25 and 0.75 inches. $L_1$ can be greater than $L_2$, typically by between 0.01 inches and 0.75 inches.

Figure 10:
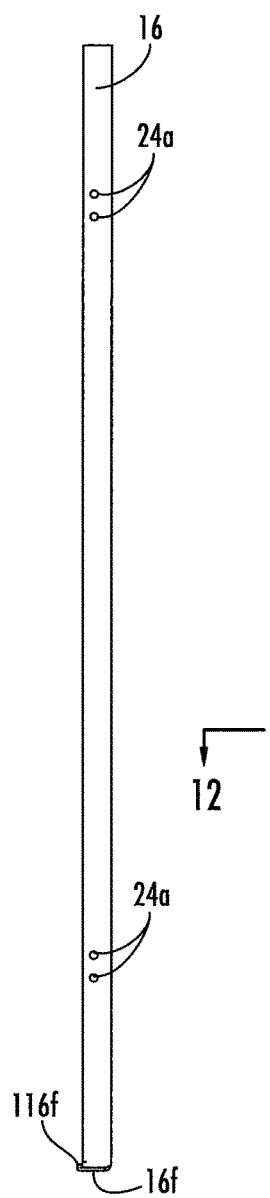
FIG. 10 is a side view of the door shown in FIG. 5.
Figure 11:
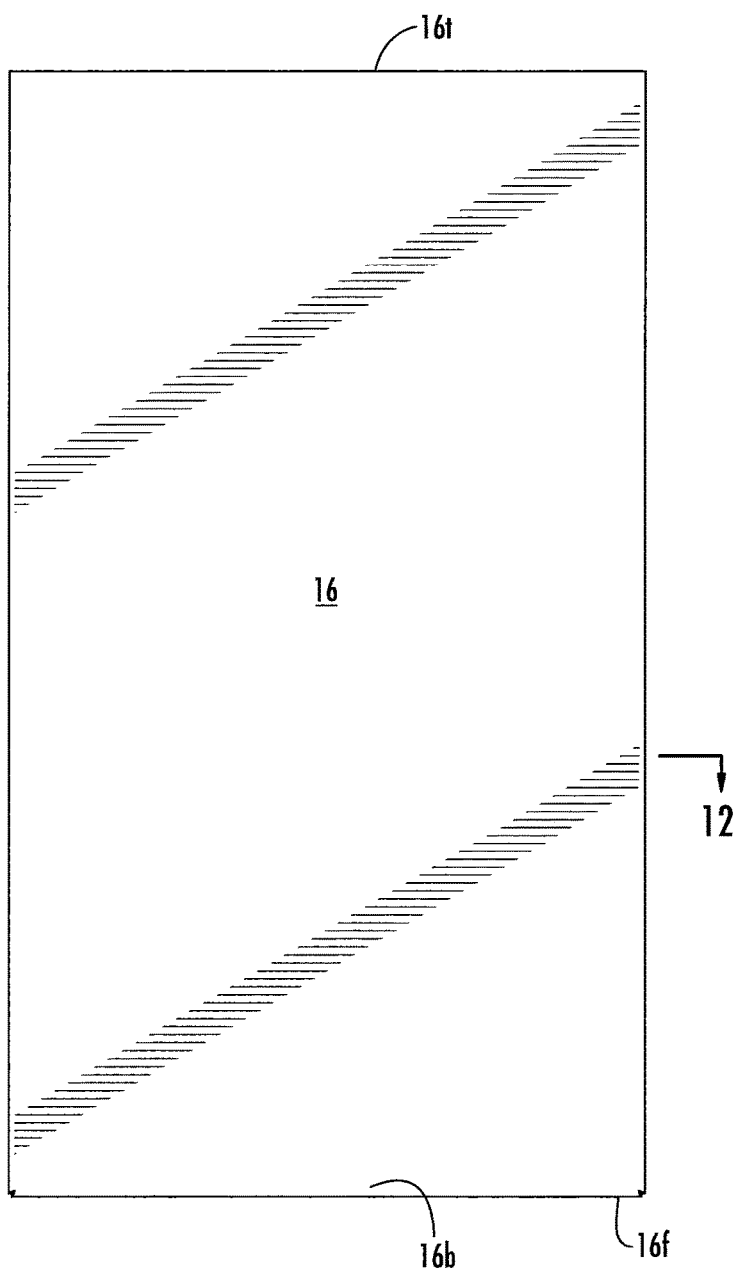
FIG. 11 is a front view of the door shown in FIG. 5.

In some embodiments, as shown in FIGS. 10 and 12, for example, the folded edge 116f of the bottom flange 116 extends a distance outward from the folded edge 124f of the side flanges 24.

As shown in FIGS. 3A and 13B, for example, one side flange 24, which can be a left side or a right side flange, can include hinge brackets 22 that cooperate with hinge members 20 held by the enclosure 4. As shown in FIG. 5, one of the side flanges 24 can include at least two pairs of longitudinally spaced apart apertures 24a for mounting the hinge brackets 22. Although shown as having two hinges, one or more additional hinges may be provided for additional strength, shown by the three pairs of apertures 24a in FIG. 5. The hinges can be telescoping hinge assemblies that allow the door 16 to travel vertically a distance while remaining attached to the enclosure 4.

Figure 14:
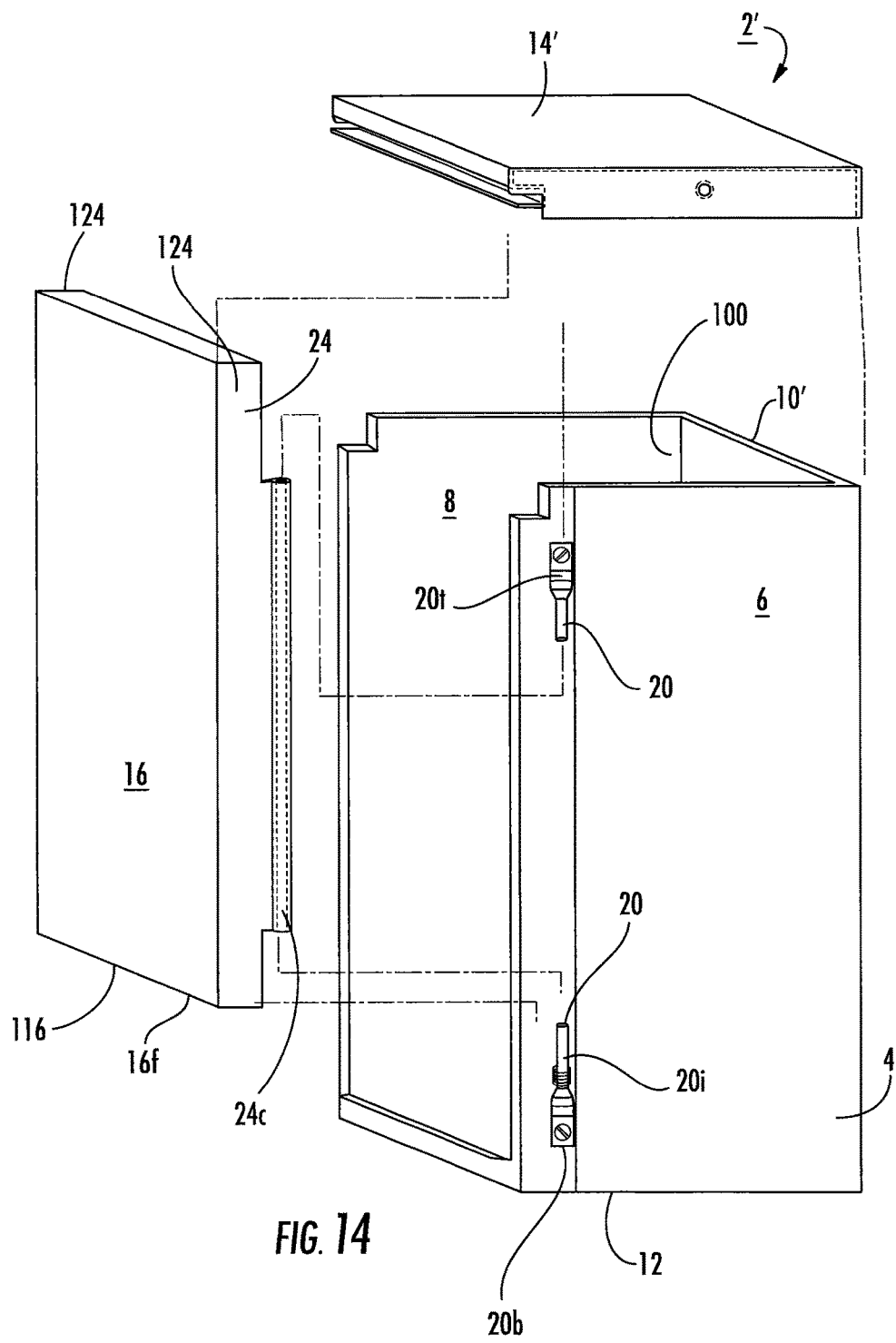
FIG. 14 is a front partially exploded view of an enclosure assembly with a different hinge assembly configuration according to embodiments of the present invention.

FIG. 14 illustrates that the enclosure 2' can have other configurations and the door 16 with the three sides with double walls 124, 116 and can have a hinge channel 24c with the hinge members 20 on the sidewall 6 of the housing 4 of the enclosure.

The door 16 can be rectangular with a height or length dimension greater than a width dimension. The depth of the enclosure may vary depending on the use.

The door 16 can be a monolithic single sheet of relatively thin sheet metal that is folded and shaped to form the side flanges 24 and the bottom flange 16f with the double walls 124, 116, respectively. The sheet metal can have a wall thickness that is between 0.031 inches and 0.114 inches. The metal can be coated and/or painted on at least exterior facing surfaces. The housing 4 and the door 16 can comprise the same or different materials/metals can have the same or different wall thicknesses.

FIG. 14 illustrates that the door 16 is not required to be a telescoping door.

Figure 15A:
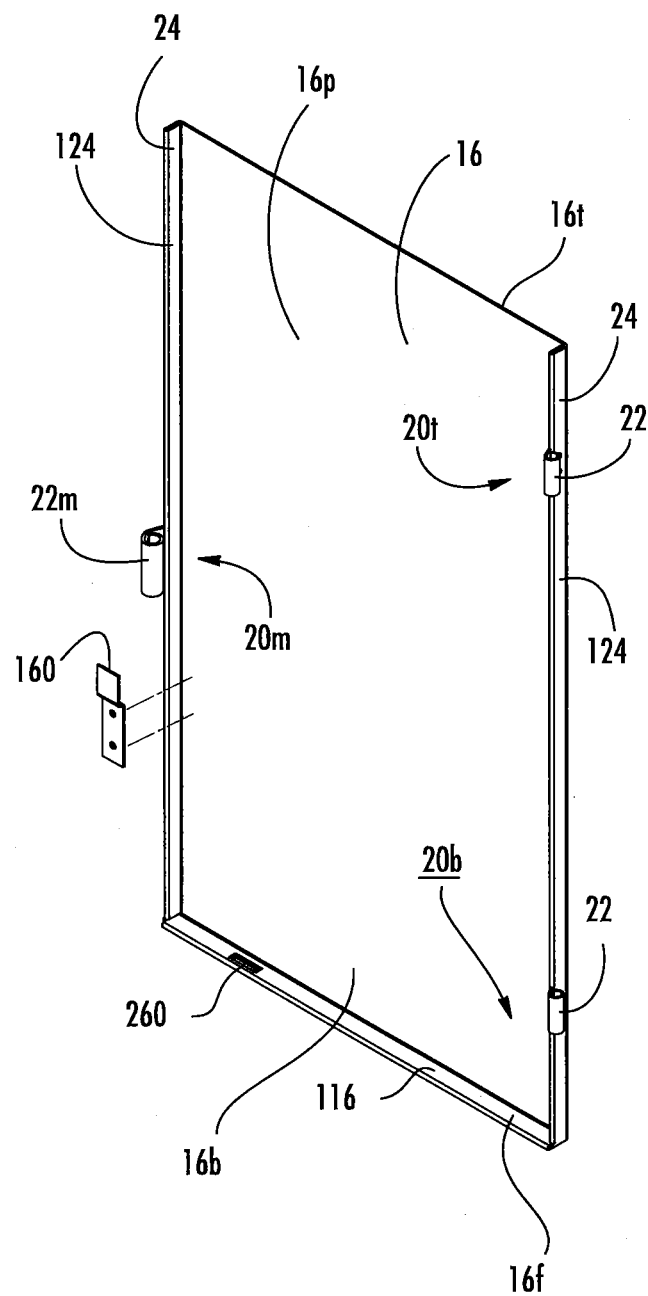
FIG. 15A is a rear side perspective view of another embodiment of the door according to embodiments of the present invention.
Figure 15B:
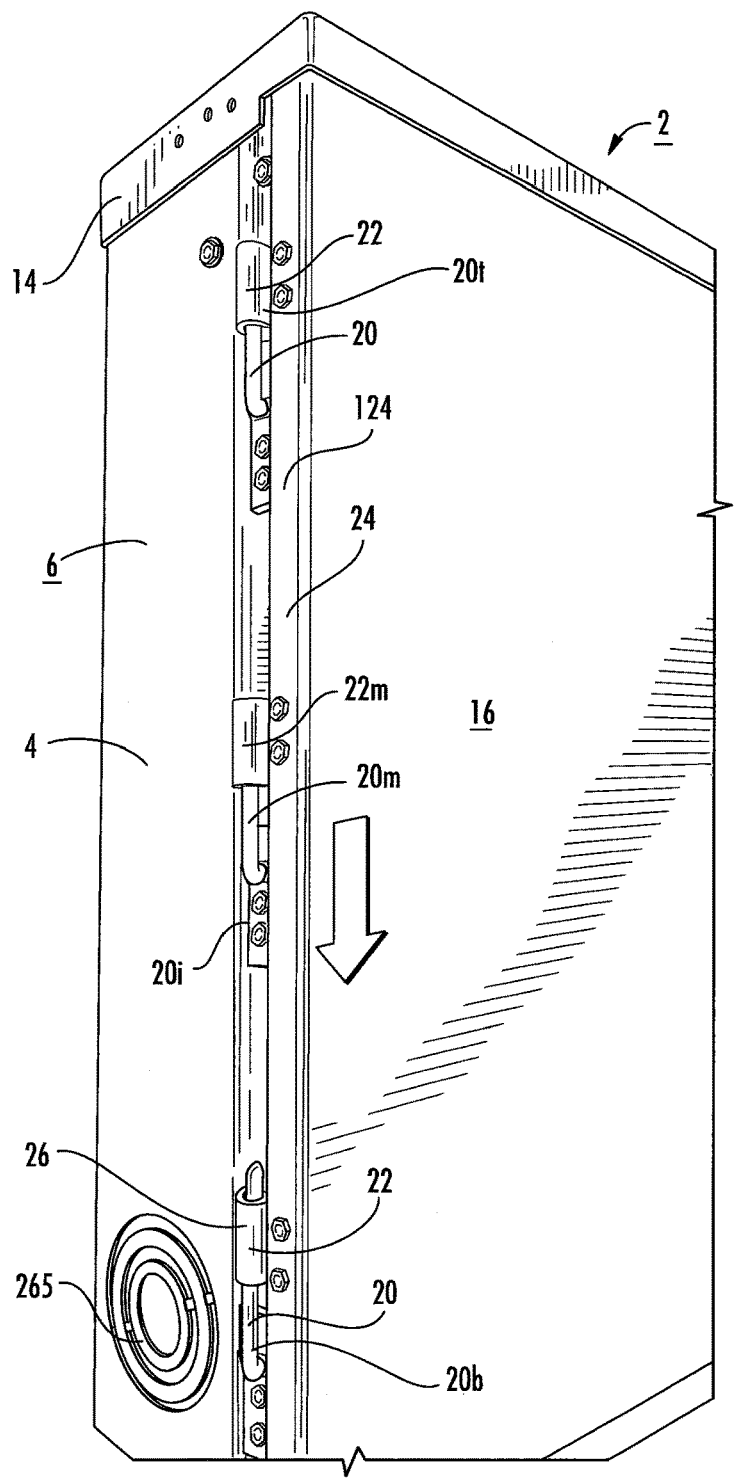
FIG. 15B is an enlarged side perspective view of an enclosure with three hinge assemblies for a telescoping door according to embodiments of the present invention.
Figure 15C:
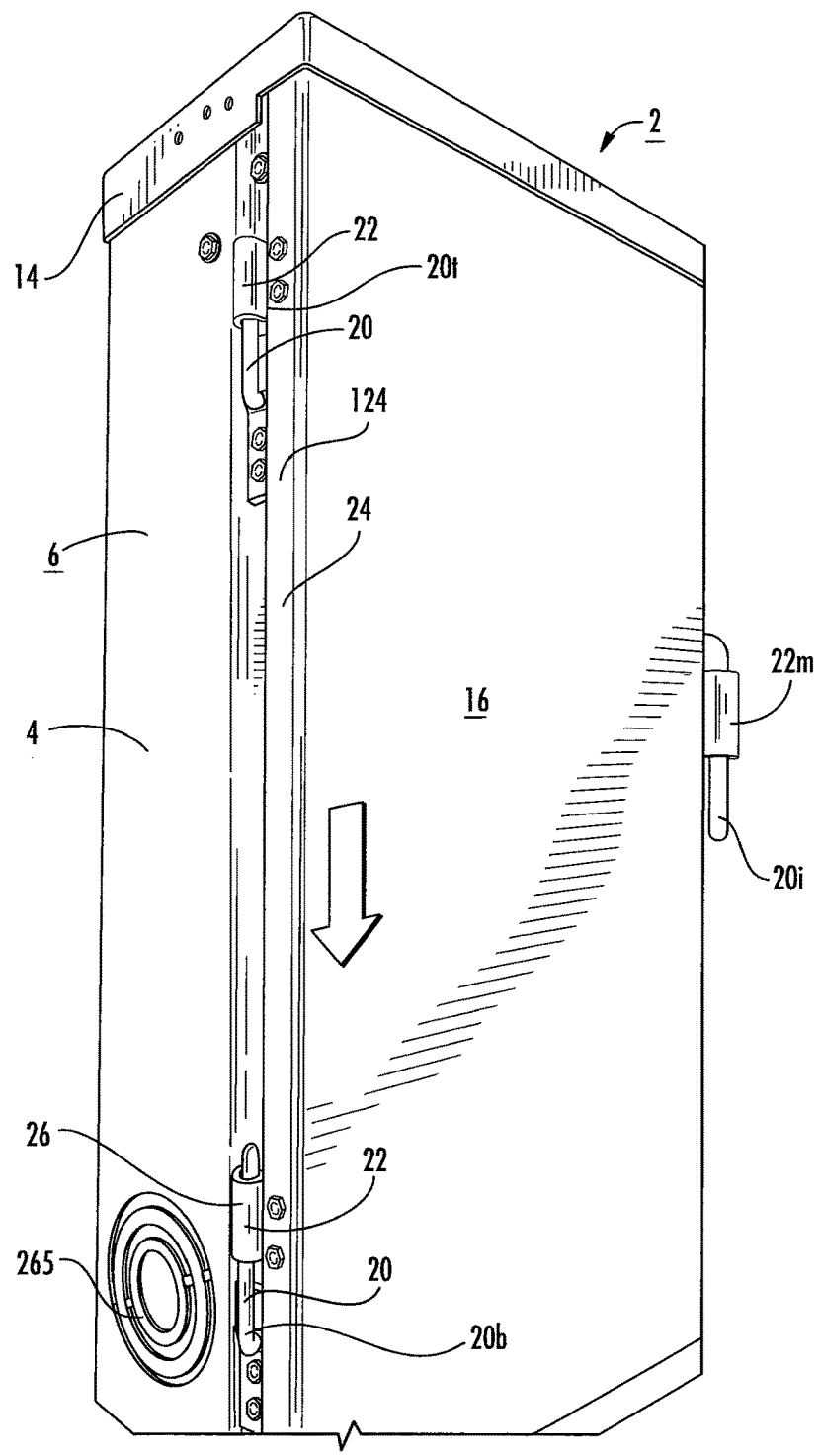
FIG. 15C is an enlarged side perspective view of an enclosure with hinge assemblies on each side of a telescoping door according to embodiments of the present invention.

As also shown in FIGS. 15A, 15B and 15C, in some embodiments, a medial hinge assembly 20m with a respective medial hinge pin 20 can be provided on either or both the right and left sides of the door 16. As shown in FIG. 15C, in some particular embodiments, the medial located hinge assembly 20m with the hinge pin 20 can be inverted 20i to redistribute some of the hinge area's strength which may provide a more positive latch and hinge engagement which, in turn, can inhibit bowing of the door 16, tearing of the door slot 260 and/or deformation of the hinge and hinge pins 26, 20. The term "inverted" with respect to the hinge and hinge pins 26, 20 refers to a hinge pin configuration rotated 180 degrees relative to an upper and/or lower hinge assembly orientation. Both the lower hinge assembly 20b and the medial hinge assembly 20m can each have hinge pins 20 that extend upwardly instead of downwardly and are, therefore "inverted" relative to the top hinge assembly 20t. The inverted hinge pin configuration 20i can be provided to a medial segment of the door 16 on either side, left or right hand side flanges 24 or both left and right side flanges 24. The lower hinge assembly 20b can be inverted or have the same orientation as the upper hinge assembly 20t.

In some embodiments, the enclosure 2 has upper and lower hinge assemblies 20t, 20b on one door side and the medial hinge assembly 20m on the other laterally opposing door side (FIG. 15A, 15C). The medial hinge assembly 20m can have an inverted orientation relative another hinge assembly. FIG. 15A illustrates an optional medial hinge bracket 22m for the optional medial hinge assembly 20m with an inverted hinge pin 20i.

When the door latch 270 (FIG. 13A) is disengaged and the telescoping door 16 descends, the non-hinged side of the door hinge disengages from the inverted hinge pin to allow the door 16 to drop open and the door 16 can rotate on the hinge-side pins of the top and bottom hinge assemblies 20t, 20b.

FIG. 15B illustrates a medial hinge assembly 20m with the inverted hinge pin 20i on the same side as the upper and lower hinge assemblies 20t, 20b.

Figure 16A:
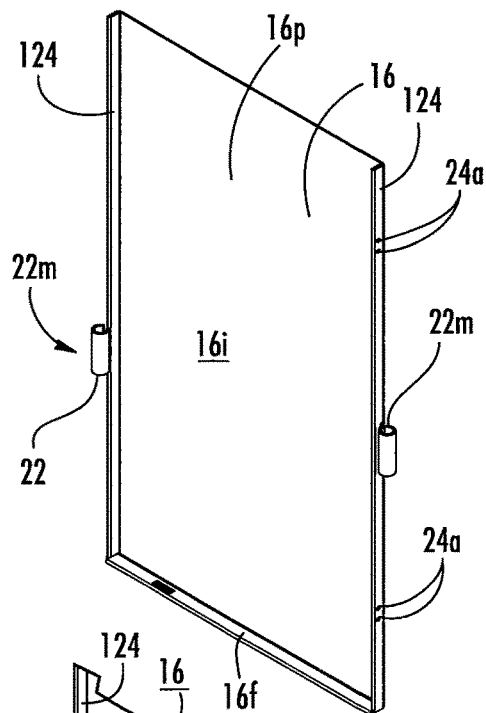
FIG. 16A is a rear side perspective view of yet another embodiment of the door according to embodiments of the present invention.

FIG. 16A illustrates that the door 16 can have right and left side medial hinge assemblies 22m with brackets 22 attached to the door side flanges 124, with only one side further comprising upper and lower hinge assemblies 20t, 20b (shown with the hinge mounting holes 24a for the brackets for these hinge assemblies).

Figure 16B:
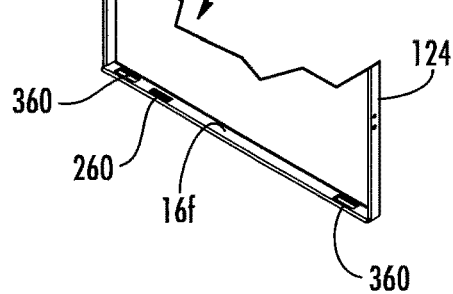
FIG. 16B is a partial rear side perspective view of the door shown in FIG. 16A with an alternative bottom flange configuration according to embodiments of the present invention.
Figure 16C:
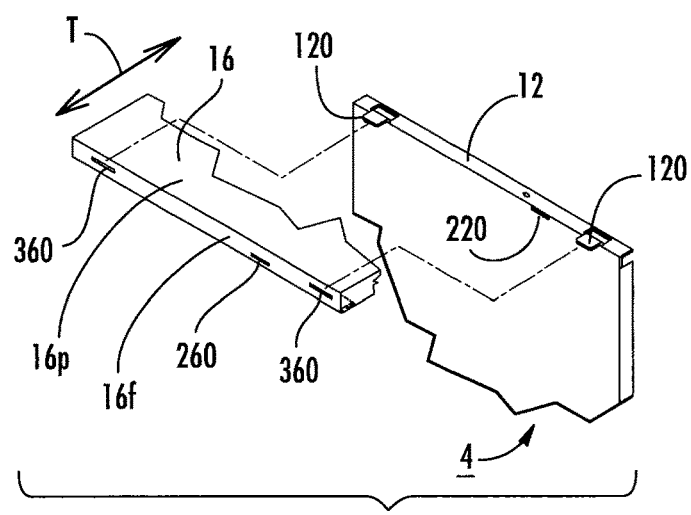
FIG. 16C is a partial exploded view of the door of FIG. 16B shown aligned with a housing member according to embodiments of the present invention.

As shown in FIGS. 16B and 16C, in some embodiments, the bottom flange 16f of the door 16 can include one or more slots 360 that engage a protrusion 120 in a bottom endwall 12 of the housing 4 to further secure door position and/or retention. As shown, the bottom endwall 12 can position a latch slot 220 that aligns with the door latch slot 260 between protrusions 120. The door flange 16*f* can position the latch slot 260 between the retention door slots 360. The door 16 can be configured to telescope in the traveling direction "T" indicated by the arrow. Thus, the protrusions 120 can slidably engage the slots 360 when in the "home" or "closed" door position, while allowing the door to travel vertically when the latch is disengaged. The primary body of the door 16*p* and the travel direction T can be parallel to the protrusions 120. An alternative configuration may also be used where the bottom flange 16*f* has a protrusion that engages a slot in the housing 4 or combinations of a slot and protrusion in the door 16 can engage a corresponding respective protrusion and slot of the housing 4. The combination of additional retention features such as the slot/protrusion engagement(s) can create a greater resistance to door system failures by counteracting or inhibiting one or more of buckling, tearing and/or deformation on the door system during an electrical event.

FIGS. 17A and 17B illustrate the enclosure 2" can be a load center. The door 16 can have the double wall flanges 124, 116 discussed above. The load center 2" includes a housing enclosure 4 and a door/panel or cover 16. As shown, the housing 4 holds a back pan 25, an interior assembly 40 with a bus 45 having one or more bus bars. The interior assembly 40 can be either detachably or permanently fastened to the back pan 25. As is well known to those of skill in the art, the interior assembly 40 (also sometimes just referred to as "the interior") can refer to the internal components of the load center 2" including the insulating barrier, i.e., sheet, film or layer (which can optionally comprise mylar), the bus 45, the retaining clips (the hook part) and the stabs (the bent-up parts) and the like. The interior assembly 40 can include or be connected to a main breaker. The load center 2" can include cables/power cords 135 that connect an external power source. The bus bars may contain stabs 48, such as branch circuit breaker stabs, that can be exposed within an insulation element so as to conduct electricity to branch circuit breakers 55, when connected. The stabs 48 may extend upwardly to contact desired components such as a branch circuit breaker 55 when connected. The one or more bus bars can remain electrically insulated from other electrically conducting elements thus avoiding the occurrence of a shorting event.

In other embodiments, the enclosure 2 provides an enclosed metering and protective electrical apparatus with a meter socket (e.g., without limitation, a test block or manual-bypass) within the housing 4. The meter socket is structured to input a power circuit and to engage a power meter (not shown; installed, for example, by a utility company). The enclosure 2 can further include a circuit interrupter, such as the example main circuit breaker, within the housing 4. See, e.g., U.S. Pat. No. 6,421,229 and/or U.S. Pat. No. 8,913,354 for a description of an exemplary metering apparatus, the contents of which are hereby incorporated by reference as if recited in full herein.

The new and improved door system can provide a high strength door system that can withstand various events such as those that may be encountered during a short circuit. These events can deliver a high velocity impact which can buckle the door in certain zones, cause latch and hinge system deformation affecting door retention, and can tear or deform latch slots that engage a latch. The door system can be particularly suitable for rain tight load centers and meter breakers but may also be useful for other high impact resistant (and typically rain tight) door is appropriate or desired.

Figure 18A:
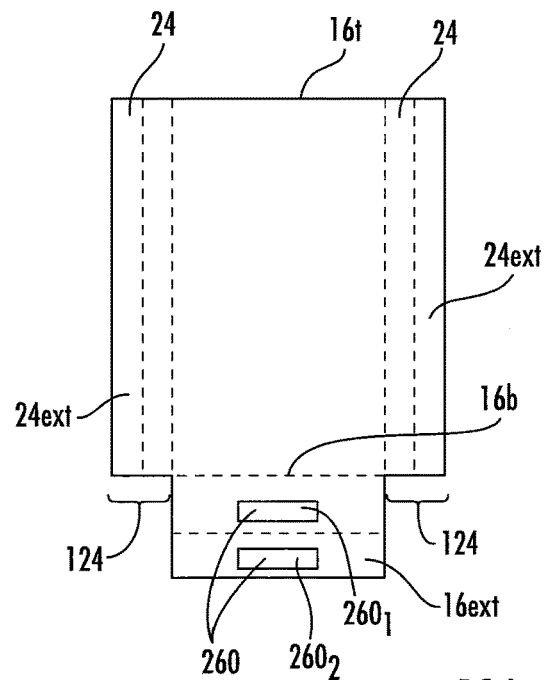
FIGS. 18A and 18B are schematic illustrations of a series of actions that can be used to form a door for an electrical enclosure according to embodiments of the present invention.
Figure 18B:
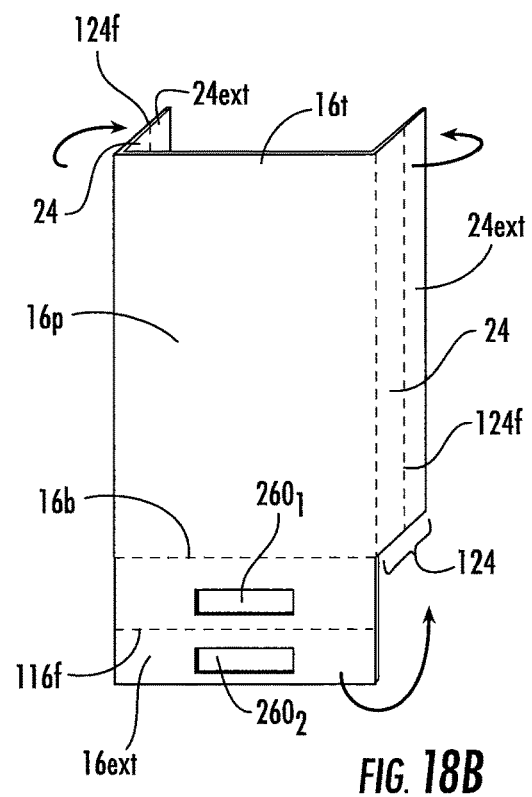

FIG. 18A and FIG. 18B illustrate an exemplary fabrication method for a high impact resistant door according to some embodiments of the present application. As shown, a single sheet of sheet metal is provided and side edge portions and a bottom portion of the sheet metal is folded several times in different directions. The sheet metal can have a shape such that the side flanges 24 are associated with extensions 24ext, which are folded to have a first orthogonal bend as shown in FIG. 18B, part of the extension 24 is then folded again in a direction toward the primary body of the door forming the fold 124*f* (FIG. 5). The bottom of the door is formed by folding the extension 16ext to be orthogonal to the primary body of the door 16*p*, then a sub-portion of this part of the sheet metal is folded back again to form the double wall 116 with the fold 116*f* facing inward and a free end 116*e* facing the primary body of the door 16 as discussed above.

The bottom segment forming the double wall 116 can have parallel slots $260_1$, $260_2$, which when folded together form the latch slot 260.

The side extensions 24ext forming the double wall 124 can have a length that is between 1.5× to 2× the length of the flange 24. As shown in FIG. 18A, the bottom extension 16ext can be more narrow than the primary body of the sheet metal with the side flange extensions extending a distance outward on each side, typically in a range that is twice of a double flange length of between 0.1 inches and 2 inches, (i.e., between 0.2 inches and 4 inches), more typically between 0.5 inches and 3 inches.

The folded walls forming the double wall thickness along the two side flanges 24 and the bottom flange 16*f* can reduce buckling and enhance strength. It is contemplated that the single component door can provide the high strength desired with lower costs relative to more complicated designs.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. An enclosure for an electrical apparatus, comprising:
    a housing comprising a back and first and second spaced apart sidewalls extending outwardly from the back, the back and first and second sidewalls providing an interior space; and
    a door pivotably attached to the housing, the door having a primary body with a bottom having a bottom flange and first and second laterally spaced apart side flanges, wherein the bottom flange and the side flanges have a folded inwardly extending edge joining first and second parallel wall segments that are orthogonal to the primary body of the door, and wherein the first and second parallel wall segments of the bottom flange comprise at least one slot extending through both the first and second parallel wall segments of the bottom flange.

2. The enclosure of claim 1, further comprising a retention bracket attached to an inner surface of the door that engages the housing.

3. The enclosure of claim 2, further comprising a bracket attached to at least one of the first and second sidewalls of the housing that engages the retention bracket of the door.

4. The enclosure of claim 1, wherein the bottom flange has a length that is greater than the side flanges.

5. The enclosure of claim 1, wherein the first and second parallel wall segments are inner and outer wall segments, and wherein the outer wall segments are longer than the inner wall segments.

6. The enclosure of claim 5, wherein the inner and outer wall segments of the side flanges and the bottom flange abut each other.

7. The enclosure of claim 1, wherein the enclosure is one of a load center or a meter breaker.

8. The enclosure of claim 1, further comprising at least one circuit breaker in the housing.

9. The enclosure of claim 1, wherein the door is a monolithic single sheet of sheet metal with bends forming the side and bottom flanges.

10. The enclosure of claim 1, further comprising a latch in the housing extending through an aligned slot of the at least one slot and configured to slide right or left to allow the door to travel downward while held by hinge assemblies of the pivotable attachment.

11. An enclosure for an electrical apparatus, comprising:
a housing comprising a back and first and second spaced apart sidewalls extending outwardly from the back, the back and first and second sidewalls providing an interior space;
a door pivotably attached to the housing, the door having a primary body with a bottom having a bottom flange and first and second laterally spaced apart side flanges, wherein the bottom flange and the side flanges have a folded inwardly extending edge joining first and second parallel wall segments that are orthogonal to the primary body of the door; and
a hood attached to the housing and the door, wherein the hood extends over a top portion of the door, and wherein the door and housing are attached with a telescoping hinge assembly to allow the door to travel vertically between upper and lower positions while held by the hinge assembly.

12. An enclosure for an electrical apparatus, comprising:
a housing comprising a back and first and second spaced apart sidewalls extending outwardly from the back, the back and first and second sidewalls providing an interior space;
a door pivotably attached to the housing, the door having a primary body with a bottom having a bottom flange and first and second laterally spaced apart side flanges, wherein the bottom flange and the side flanges have a folded inwardly extending edge joining first and second parallel wall segments that are orthogonal to the primary body of the door;
a retention bracket attached to an inner surface of the door that engages the housing; and
a hood attached to the housing and the door, wherein the hood extends over a top portion of the door, wherein the door and housing are attached with a telescoping hinge assembly to allow the door to travel vertically between upper and lower positions while held by the hinge assembly,
wherein at least one of the first and second sidewalls of the housing comprises a flange that extends inward, in a direction orthogonal to the sidewalls, and wherein the flange comprises a longitudinally extending notch with an open inner perimeter that engages the retention bracket when the door is in the upper position.

13. An enclosure for an electrical apparatus, comprising:
a housing comprising a back and first and second spaced apart sidewalls extending outwardly from the back, the back and first and second sidewalls providing an interior space; and
a door pivotably attached to the housing, the door having a primary body with a bottom having a bottom flange and first and second laterally spaced apart side flanges, wherein the bottom flange and the side flanges have a folded inwardly extending edge joining first and second parallel wall segments that are orthogonal to the primary body of the door,
wherein the door has a flangeless top and the three side flanges have a length between 0.25 inches and 1.5 inch.

14. An enclosure for an electrical apparatus, comprising:
a housing comprising a back and first and second spaced apart sidewalls extending outwardly from the back, the back and first and second sidewalls providing an interior space; and
a door pivotably attached to the housing, the door having a primary body with a bottom having a bottom flange and first and second laterally spaced apart side flanges, wherein the bottom flange and the side flanges have a folded inwardly extending edge joining first and second parallel wall segments that are orthogonal to the primary body of the door,
wherein the door and housing are attached with at least one telescoping hinge assembly on a first side to allow the door to travel vertically between upper and lower positions while held by the at least one hinge assembly, and wherein the door and housing are attached at a medial segment at a second opposing side by a sliding hinge assembly that disengages when the door is extended down to allow the door to rotate open via the hinge assembly on the first side.

15. An enclosure for an electrical apparatus, comprising:
a housing comprising a back and first and second spaced apart sidewalls extending outwardly from the back, the back and first and second sidewalls providing an interior space;
a door pivotably attached to the housing, the door having a primary body with a bottom having a bottom flange and first and second laterally spaced apart side flanges, wherein the bottom flange and the side flanges have a folded inwardly extending edge joining first and second parallel wall segments that are orthogonal to the primary body of the door; and
first, second and third telescoping hinge members attached to at least one of the first and second sidewalls of the housing and the door providing the pivotable attachment, with a medial one of the first, second and third hinge assemblies having an inverted orientation relative to an upper and lower hinge assembly.

16. An enclosure for an electrical apparatus, comprising:
a housing comprising a back and first and second spaced apart sidewalls extending outwardly from the back, the back and first and second sidewalls providing an interior space;
a door pivotably attached to the housing, the door having a primary body with a bottom having a bottom flange and first and second laterally spaced apart side flanges, wherein the bottom flange and the side flanges have a folded inwardly extending edge joining first and second parallel wall segments that are orthogonal to the primary body of the door, wherein an outer wall segment of the first and second wall segments of the bottom flange comprises slots that engage downwardly extending protrusions of the housing.

17. A method of fabricating a door for an electrical apparatus, comprising:

providing a single sheet of sheet metal for a door of an electrical apparatus;

bending side portions of the sheet of sheet metal to extend in an orthogonal direction from a primary body portion;

folding a partial length of the bent side portions toward the primary body portion to form side flanges with parallel double walls;

bending a bottom portion of the sheet metal to extend in an orthogonal direction from the primary body portion;

folding a partial length of the bent bottom portion toward the primary body portion to form a bottom flange with parallel double walls; and forming a door for the electrical apparatus with a flangeless top and the sides and bottom flanges with double walls.

18. The method of claim 17, wherein the sheet is provided with parallel slots in the bottom portion, which when bent to form the double walls of the bottom portion, align to provide a through slot.

19. The method of claim 17, wherein the folding steps are carried out to provide abutting double walls as the double walls, and wherein the bottom flange extends inwardly a greater distance than the side flanges by between 0.1 inches and 0.25 inches.

* * * * *